United States Patent
Greiwe et al.

(10) Patent No.: US 12,547,776 B2
(45) Date of Patent: Feb. 10, 2026

(54) METHODS AND ASSOCIATED COMPUTER SYSTEMS FOR ENSURING THE INTEGRITY OF DATA

(71) Applicant: KRALOS GMBH, Burgdorf (DE)

(72) Inventors: Christian Clemens Greiwe, Burgdorf (DE); Carsten Klein, Burgdorf (DE)

(73) Assignee: KraLos GmbH, Burgdorf (DE)

( * ) Notice: Subject to any disclaimer, the term of this patent is extended or adjusted under 35 U.S.C. 154(b) by 0 days.

(21) Appl. No.: 18/707,796

(22) PCT Filed: Nov. 8, 2022

(86) PCT No.: PCT/EP2022/081183
§ 371 (c)(1),
(2) Date: May 6, 2024

(87) PCT Pub. No.: WO2023/079186
PCT Pub. Date: May 11, 2023

(65) Prior Publication Data
US 2024/0427939 A1   Dec. 26, 2024

(30) Foreign Application Priority Data

Nov. 8, 2021 (LU) ........................................ 500837

(51) Int. Cl.
*G06F 21/64* (2013.01)
*H04L 9/40* (2022.01)

(52) U.S. Cl.
CPC .......... *G06F 21/64* (2013.01); *H04L 63/1441* (2013.01)

(58) Field of Classification Search
CPC .............................. G06F 21/64; H04L 63/1441
See application file for complete search history.

(56) References Cited

U.S. PATENT DOCUMENTS 10,409,995 B1 * 9/2019 Wasiq ...................... H04L 9/08
2001/0044820 A1   11/2001 Scott
(Continued)

FOREIGN PATENT DOCUMENTS

KR   20080004904 A * 1/2008 ............. G06F 21/55
KR   20150071289 A * 6/2015 ............. G06F 21/50

OTHER PUBLICATIONS

Anonymous, "Reverse proxy—Wikipedia", Sep. 9, 2021 (Sep. 9, 2021), pp. 1-3, XP055933388, Found on the Internet: URL:https://en.wikipedia.org/w/index.php?title=Reverse_proxy&oldid=1043378821 [found on Jun. 20, 2022].
(Continued)

*Primary Examiner* — Michael R Vaughan
(74) *Attorney, Agent, or Firm* — Fresh IP PLC; Terrence L. B. Brown (57) ABSTRACT

The present invention relates generally to a method and corresponding computer-based devices for securing the integrity of the data for operating a service (8). In particular, the invention relates to a method for generating an intended state (3) of data that can be stored or secured in a medium or system (1), for transferring the intended state of the data to a further system (7), for securing the integrity of the data on the further system and for enabling subsequent analysis after undesired tampering with the data. The invention also relates to computer-based devices, a computer system and a computer network which execute or enable the execution of this method or the individual steps therein, as well as a computer-readable medium with computer-executable instructions.

12 Claims, 4 Drawing Sheets

(56) References Cited

U.S. PATENT DOCUMENTS

| | | |
|---|---|---|
| 2005/0193096 A1 | 9/2005 | Yu et al. |
| 2008/0098301 A1 | 4/2008 | Black et al. |
| 2008/0134337 A1* | 6/2008 | Crescenzo ............ G06F 21/565 |
| | | 726/24 |
| 2018/0205549 A1* | 7/2018 | Blinn ...................... H04L 67/02 |
| 2019/0098080 A1* | 3/2019 | Bermudez ............... G06F 9/505 |
| 2020/0366696 A1 | 11/2020 | Willis |
| 2022/0360595 A1* | 11/2022 | Bule ................... H04L 63/0227 |
| 2024/0265057 A1* | 8/2024 | Kol ......................... H04L 67/59 |

OTHER PUBLICATIONS

ISA (EPO), Written opinion of the International Searching Authority for PCT/EP2022/081183, Mar. 16, 2023.
ISA (EPO), International Search Report for PCT/EP2022/081183, Mar. 16, 2023.

* cited by examiner

METHODS AND ASSOCIATED COMPUTER SYSTEMS FOR ENSURING THE INTEGRITY OF DATA

CROSS-REFERENCE TO RELATED APPLICATIONS

This application is a National Stage entry under § 371 of International Application No. PCT/EP2022/081183, filed on Nov. 8, 2022, and which claims the benefit of priority to Luxembourg Patent Application No. LU500837, filed on Nov. 8, 2021. The content of each of these applications is hereby incorporated by reference in its entirety.

FIELD OF THE INVENTION

The present invention relates generally to a method and corresponding computer-based devices for securing the integrity of the data for operating a service. In particular, the invention relates to a method for generating an intended state of data that can be stored or secured in a medium or system, for transferring the intended state of the data to a further system, for checking and securing the integrity of the data on the further system, and for enabling subsequent analysis after undesired manipulation of the data. The invention further relates to computer-readable media with computer-executable program products, to computer systems which contain these media and program products, and to a computer network of computer systems, wherein these carry out the method or the individual method steps at least partially or completely.

STATE OF THE RELATED ART

The present invention relates to the technical field of data processing, in particular it is an invention in the field of IT security. In this technical field of data processing, various techniques are known from the state of the related art.

In particular, IT security must be understood less as a state and much more as a process, as there are always new developments, both on the part of attackers and on the part of users who want to protect their systems, which spread rapidly via the Internet.

Various methods have been established for securing computer communication via networks.

A computer is a physical representation of a universal Turing machine. It runs a computer program that provides basic functions such as file access, (visual) user interfaces ((graphic) user interface, (G)UI) or network functionalities (operating system, OS). The operating system in turn allows the operation of other software that can be written at a different level of abstraction.

A computer usually consists of at least one central processing unit (CPU), a main memory (RAM) and a permanent memory.

So-called smartphones or IoT (Internet of Things) devices, such as webcams, smart lights, thermostats, washing machines, dishwashers, etc. can also be computers according to this definition.

A network is a group of logically separate computer systems that can communicate with each other. If several computer systems are operated on one physical computer and these computer systems can communicate with each other, this is also referred to as a network.

If you want to distinguish between a network of computers and a network of computer systems within a computer, the former is referred to as a physical network and the latter as a virtual network. A virtual network (virtual local area network, VLAN) can also be created via a physical network between computer systems that are distributed across several computers.

Networks are primarily used to exchange information between computers. This exchange of information takes place via various (web) services.

A (web) service consists of at least one computer program that provides at least one functionality via a network. This can also be a virtual network within a host computer. Web services usually disclose information. The words service, web service or Internet service are used synonymously with web services. Web services are usually characterized by the fact that they can be accessed via certain predefined protocols such as hypertext transfer protocol (HTTP).

In principle, there are various options for operating and scaling a web service. The obvious way would probably be to operate a computer in a network with an operating system and run a web service on this computer.

For scaling, you could then first upgrade the computer until it is at the maximum performance level of the current hardware generation.

For various reasons, different means of virtualization, in particular virtual machines and so-called containers (also known as jails), have become established.

A computer system here therefore refers to any configuration (computer with operating system, virtual machine, container, etc.) that meets the necessary requirements for operating a web service (usually provision of a file system, network functionality and operation of software). To provide software functionality, a computer system comprises in particular media (hardware) with computer programs (computer-readable software) stored on it.

A software agent, hereinafter also referred to as agent, refers to a computer program that has a precisely specified, independent behavior, i.e. performs its specific task without external prompting.

A computer system that provides a web service in a network is called a server or web server.

A network where you have to assume that a potential attacker has access to another computer in this network, so that the attacker can send any data over the network and thus possibly attack your own computer system, is insecure. In particular, the Internet is an insecure network.

Various techniques are available to secure communication via a potentially insecure network.

For example, a technique is known from the state of the related art in which a so-called scatter value (also known as a hash or hash value or checksum) is calculated from data. A so-called scatter value function (hash function) is regularly used for this. Such a hash function is provided, for example, by the secure hash algorithm (SHA). With a hash function, a data block that is not necessarily limited in size can often be mapped to a data block of a fixed size, the hash or hash value. A typical length for a hash is 256 bits, for example. A desirable property of a good cryptological hash function is approximate injectivity and thus approximate collision resistance. The "ideal hash function" is therefore completely link-unique and collision-free and always maps different input data to different hashes.

The Transmission Control Protocol (TCP) is a typical use case for a hash function, wherein a hash value is calculated for a larger amount of data. For example, a larger amount of data is to be transmitted via a transmission medium that may not be secure, such as the Internet. For example, a technical error may cause part of the data to be transmitted incorrectly or a third party (attacker) may manipulate this data.

If the sender of the data calculates its hash value and makes this hash value available to the receiver, the receiver can verify the authenticity and integrity of the data, provided that the hash value itself is genuine and reliable.

Apart from the use of checksums, the use of encryption, especially asymmetric encryption, has become established. This offers the advantage that the key exchange can take place via an insecure network. A private and a public key are generated. Data that has been encrypted with the public key can only be decrypted using the private key.

In addition to checking the integrity after a transmission using checksums, there is also the safeguarding of integrity through the use of certificates. This is generally based on the use of asymmetric encryption, in which a web service provides a certificate in which a trustworthy authority (certificate authority) guarantees the identity of the web service (by means of a signature using a certificate). A certificate then usually contains a public key that can be used to encrypt the initial communication with the web service.

However, the hash method has the disadvantage that the method is completely invalidated if the hash value itself is manipulated during a man-in-the-middle attack. In one example, a user A (e.g. Alice) transfers a file to a user B (e.g. Bob) and also the hash value of the file. An attacker E (e.g. Eve) intercepts this communication and replaces the file with a fake file. The forged file contains forged data. In addition, E replaces the hash value of the file with the hash value of the forged file. When B now receives the data and checks it by calculating the hash function of the file itself and comparing it with the hash value, he comes to the conclusion that the data has not been manipulated. Thus, E has successfully manipulated the data without this being detected by B. This cannot necessarily be detected even by common encryption methods such as SSL, as the certificates used for encryption can also be replaced by E, so that both parties communicate with E in encrypted form and assume that the connection is secure.

Man-in-the-middle attacks can be avoided as far as possible by both parties exchanging which certificates they expect from each other beforehand during communication between A and B, thereby ruling out the possibility of an attacker E manipulating the communication. This process is known as certificate pinning.

As soon as the communication between two computers is sufficiently protected, it becomes easier and therefore cheaper for a potential attacker to attack one of the communication parties directly in order to intercept or manipulate the communication. It is therefore essential that individual computer systems are also adequately secured.

Attacks on web services are particularly attractive to potential attackers because a successful attack can give them access to communications with dozens, hundreds or thousands of the victim's customers, who in turn believe the data loaded is legitimate and trust it.

This results in a particular need for protection for operators of web services, especially as the operator's competitors and other interest groups such as hackers with a profit motive, but also groups such as Anonymous, which attack targets purely on the basis of an ideological drive.

In addition, the introduction of data protection regulations such as the General Data Protection Regulation (GDPR), but also previously in the handling of payment data such as credit card data, poses a considerable economic risk of damage associated with the operation of a web service.

In general, it can be said that when securing computer systems, an approach with as many layers of protection as possible is necessary, as almost any protection system can be overcome, but economically motivated attackers in particular usually attack the simplest targets first, as they are also subject to a profit maximization intention. Many simple and successful attacks are usually more profitable than an attack on a complex secured system. Therefore, the benefits of further security measures normally outweigh the costs incurred for the security measures.

The first layer of protection against an attacker is usually a firewall, which monitors both incoming and outgoing communication on a computer and allows processes on the computer to be assigned to specific protocols, ports, URLs and IP addresses.

A blacklisting, i.e. a negative determination of access rights, or a whitelisting, i.e. a positive determination of access rights, can be carried out.

Antivirus programs regularly scan the permanent memory of a computer for known malware. To do this, the provider of an antivirus program collects signatures of known malware and often also certain behavioral patterns. The disadvantage of this is that scanning the storage medium in this way is relatively computationally intensive and therefore time-consuming. In addition, the malware must already be known.

Another protective measure for securing IT systems is authorization management, which regulates the sensible administration of access authorizations. According to the "principle of least privilege", applications and processes should only be started with the minimum necessary authorizations. Furthermore, structures in the file system should only be changeable to the extent that this is necessary for the respective technical user (e.g. user for running a web server). This could, for example, have read authorization for the corresponding configuration without also being able to write the configuration.

In practice, this measure is very time-consuming and often leads to misconfigurations, as the correct configuration of authorization management is very complex and confusing.

Sandboxing is a method in which the operating system usually ensures that an application can only access an area of the file system assigned to it, so that this application cannot manipulate data from other applications and, in particular, other applications. It is therefore basically an automated special application of authorization management.

DE 601 32 833 T2 discloses a method in which data entering a computer system that could lead to possible manipulation is transferred to an isolated sandbox area where it can be analyzed. Cryptographic encryption is used to secure the transmission of the potentially harmful data, which is only removed in the sandbox area. The method is specifically aimed at a computer system that regularly receives data and therefore requires an intelligent check that classifies incoming data as potentially harmful. The method involves checking the entire file as soon as it is transferred to the computer system, so that no data changes need to be monitored or differentiated.

Another option is the isolation of different services into separate computer systems. Instead of providing several services such as webmail, database and website on one computer within an operating system, these services are distributed to different virtual machines or containers, for example, so that a compromised mail server does not automatically lead to the database being compromised.

In addition to the solution using antivirus programs, where a negative authorization list (programs that are not allowed to run) is kept, there is also the option of only allowing certain applications, the integrity of which is often ensured by checksums. This option is known as whitelisting.

Methods are known from US 2020/366696 A1 and US 2001/044820 A1 in which the integrity of web services in particular is monitored in order to do justice to the challenging risk situation on the World Wide Web. In these methods, however, only a previously specified warning is issued to another system in response to an identified manipulation of the web service or the web service is stopped in parts or the manipulated code is removed. This means that the complete web service is not restored. In particular, if it was unclear which part of the web service was compromised and in what way, it is not possible to subsequently analyze the target of the attack and the type of attack while simultaneously restoring the web service.

DE 20 2014 010 889 U1 discloses a method for verifying the trustworthiness of at least one web service on a server that is exposed on the Internet. Web applications hosted there or changes to these web applications are checked for their trustworthiness using a combination of the methods described above, including blacklisting and whitelisting, checking known virus and malware code, and checking for changes to cryptographic hash values, as well as listing and evaluating various data sources with regard to their confidence. Unknown attack methods could still initially overcome the automated checking procedures so that malicious code could be hosted on the server. However, the server described comprises both the verified and unverified web applications as well as the verification criteria for verified web applications, so that successful external access to this server (compare: man-in-the-middle attack) could manipulate the intended state of the hosted web applications and possibly manipulate future verification criteria without being noticed, as it is not a distributed or separate computer system.

A computer system that is protected to a particular extent by the application of other, in particular several complementary methods from the state of the related art and in particular is only accessible to a limited extent from an insecure network such as the Internet is a protected computer system within the meaning of this document.

A particularly high standard of protection in the area of IT security is provided by the so-called zero-trust approach. Zero trust implies that no participant or user, for example of a network, is trusted from the ground up. For example, the zero-trust approach means that requested changes to certain data of a web service are always checked before the change is implemented.

In addition to securing a web service, the focus is also on efficiency. Long loading times in particular quickly lead to users "bouncing" and impatiently calling up the website of an alternative provider, but cost-effective scaling also plays a role in the economic operation of web services.

The data provided by a web service is often recalculated in part or in full at the time of the request. Caching is the process by which the generated data, e.g. HTML documents, are stored for a period of time and then delivered again when an identical request is made during this period, without the entire calculation having to take place again. This saves computing power and minimizes the loading time of the data accordingly. Caching for web services is known from US 2005/0193096 A1 and US 2008/0098301 A1.

As already described, when operating a web service, there is sometimes a need to process the load more efficiently, for example to satisfy more users. A key characteristic for the success of a web service is sometimes the loading time before the server provides the user with a response (response time).

In order to keep this loading time as short as possible, additional computer systems are usually provided as servers that process requests in parallel and can thus significantly reduce the average waiting time for a large number of requests.

Furthermore, operators of an international web service can also decide to operate computer systems in other data centers in order to reduce the distance to their customers so that the loading times for the customer are not affected by imponderables such as physical limitations of the transmission lines, peering agreements between different Internet service providers (ISPs) or similar.

These methods are also generally suitable for increasing the reliability of a web service.

Methods of the type described here are called "load balancing" or load distribution.

In addition to the methods already described, other technologies that can play a role in the operation of a web service should be mentioned for the sake of completeness:

Bittorrent is a protocol for exchanging files on the Internet. Files are exchanged directly between computers via a network without the need for a central authority for coordination. The protocol also uses checksums to check parts of files for correct transmission. Some providers offer data synchronization based on this protocol. This is also suitable, for example, for synchronizing the data for operating a web service between different computer systems that jointly implement load balancing.

In many networks, especially company networks, there is also a so-called proxy, which receives requests from computers in the network to the Internet and forwards them to the corresponding servers. This is usually done for security reasons or for the purpose of prohibitions within the network. By using a proxy, the IP address of a computer can also be disguised, as the computer addressed only receives the IP address of the proxy.

A reverse proxy is the opposite. It is usually connected upstream of the actual web service when operating a web service in order to secure the web service, to conceal certain functions of the web service from the Internet or to implement load balancing.

Task

The task of the present invention consists in securing the integrity of data, such as files or data stored in databases on servers that offer a web service and are exposed in a network. Furthermore, it is the task of the present invention to effect an immediate isolation of compromised data in the event of manipulation, in particular on a server or on a computer-readable medium. The isolated data should not be able to cause any damage to the computer system, but at the same time should be analyzable. In addition, the data and the web service should be restored to a state prior to manipulation.

Solution

According to the invention, the task is solved by a method for protecting the integrity of the data comprising the following steps:
 a) Generating (S01) an intended state (3) of data of a web service (2) on a first/primary secure computer system (herein also referred to as primary system or primary computer system) (1);

b) Transferring of data (S02) through a secure connection to one or more servers (also referred to herein as secondary computer systems) (7) in a potentially insecure network to provide a web service (8);

c) Checking (S03) (20) the integrity of data, preferably by an agent in the secondary computer system (11), in such a way that tampering with the data, in particular the files and data, by an attacker is detected;

d) Restoring (S04) (21), in particular immediate restoring, of the intended state of the data (19) at the time before tampering, in particular unintentional tampering;

wherein preferably between steps S03 and S04, i.e. between the step of checking (S03) and the step of Restoring (S04) after a manipulation (17), the data is placed in quarantine, so that it is subsequently analyzed but can no longer be executed and thus cannot cause any damage.

Further advantageous embodiments can be found in the sub-claims and the description.

General Advantages

The method according to the invention significantly increases security when operating a web service, while considerably reducing the technical effort required to secure it and thus the costs of operation. The software architecture principles reduce or eliminate the generally known technical risks when operating a web service without in-depth specific knowledge of the program used. In its embodiment according to the invention, the tamper protection corresponds to the zero-trust principle according to the principle "do not trust, always verify", but at the same time allows a subsequent analysis of potential attacks. Furthermore, the method according to the invention increases the technical effort and thus the costs for a potential attacker enormously, as this a) must know that the web service is protected by this method, b) cannot attack the agent (11), as the agent in the secondary system is itself protected by the method, c) he cannot use the web service (8) to attack other users without being detected, d) cannot attack the primary system (1) either, as this communicates exclusively with the agent via a secure connection and is not otherwise connected to the insecure network.

Due to the significantly increased costs for the attacker, it cannot be assumed that such a protected secondary system (7) would continue to be attacked, as attackers are also subject to economic constraints and thus have to maximize profit per effort.

DETAILED DESCRIPTION OF THE INVENTION

According to the method according to the invention, an intended state of data is generated on a primary computer system in a protected network (S01). This data comprises, in particular, files for providing a web service and data from databases. By storing the data in the protected network, the intended state of the data cannot be directly attacked or manipulated.

The data is transferred to a secondary computer system on which the web service is executed (S02). This secondary computer system is exposed in an insecure network, for example on the Internet, and is therefore vulnerable.

According to a preferred embodiment of the present invention, between steps S03 and S04, i.e. between the step of checking (S03) and the step of Restoring (S04), the data is placed in quarantine after an unintentional manipulation has been detected, so that the data can be analyzed retrospectively but can no longer be executed, which advantageously prevents further damage after the check.

The integrity of at least one secondary computer system in the insecure network is therefore advantageously checked by a computer program (hereinafter: agent) (S03). Manipulated data is placed in quarantine, preferably by the agent, after an unintentional manipulation has been detected, so that the data can be analyzed afterwards but can no longer be executed, which advantageously prevents further damage after the check. According to the invention, this manipulation can be designed in such a way that manipulations are always placed in quarantine, even if it is not clear whether the manipulation is of a hostile nature. A system protected in this way is advantageously secured in accordance with the zero-trust approach and is advantageously suitable for security-critical web services in exposed networks. Placing the data in quarantine serves to protect the computer system. For this purpose, conspicuous (manipulated) data, e.g. a corrupted file, is moved to a directory, preferably on a server, from which a program contained in this file cannot be started (isolation). Preferably, this directory is located on another separate system, wherein this system has no access rights to other systems and does not allow the execution of external programs. Alternatively preferred, isolation is achieved by sandboxing on the secondary system. Alternatively preferred, isolation is achieved by restrictive authorization management of a directory on the secondary system.

Following manipulation, the agent restores the intended state from S01 (S04). Restoring the state is preferably initialized immediately when the manipulation is detected in order to be able to offer the web service again as quickly as technically possible.

In a preferred embodiment, changes to the data, as an example of manipulation (17) of data, are detected based on cryptographic methods.

Signatures using certificates, for example, are a suitable cryptographic method. This method is standardized and less prone to errors, so that false positives should not occur.

Alternatively, it is preferable to use hash values such as SHA256, SHA512, MD5 with the lowest possible collision probability to ensure that the file does not undergo any changes, which may be slightly more error-prone, but could also be more secure.

In a further preferred embodiment of the invention, checking (S03) (20) the integrity of the data (also referred to as verifying), in particular of files or parts of files, takes place immediately after manipulating the data, in particular the files or parts of files.

This can be achieved, for example, by regularly checking the integrity, in particular more frequently than once per hour, in particular more frequently than once per 30 minutes, in particular more frequently than once per 10 minutes, in particular more frequently than once per 5 minutes, in particular more frequently than once per minute, in particular more frequently than once per second, furthermore in particular more frequently than once per 500 milliseconds, furthermore in particular more frequently than once per 100 milliseconds, furthermore in particular more frequently than once per 10 milliseconds, furthermore in particular more frequently than once per millisecond, furthermore in particular more frequently than once per 500 microseconds, furthermore in particular more frequently than once per 100 microseconds, furthermore in particular more frequently than once per 100 microseconds, furthermore in particular more frequently than once per 10 microseconds, furthermore in particular more frequently than once per microsecond, furthermore in particular more frequently than once per 500 nanoseconds, furthermore in particular more frequently than once per 100 nanoseconds, furthermore in particular more frequently than once per 10 nanoseconds, furthermore in particular more frequently than once per nanosecond, furthermore in particular more frequently than once per 500 picoseconds, furthermore in particular more frequently than once per 100 picoseconds, furthermore in particular more frequently than once per 10 picoseconds, furthermore in particular more frequently than once per picosecond, furthermore in particular more frequently than once per 500 femtoseconds, furthermore in particular more frequently than once per 100 femtoseconds, furthermore in particular more frequently than once per 10 femtoseconds, furthermore in particular more frequently than once per femtosecond.

In the case of regular file checks, the check interval should preferably be in the order of magnitude of the execution time of the necessary CPU clock cycles, depending on the check algorithm used.

Regular checks within very short time intervals reduce the time an attacker has to reach their targets, so that in the best case scenario they cannot cause any damage. Since many attacks require a manual analysis by the attacker after a (partially) automatic infection of the attacked system, a significantly higher level of security can be achieved with checks with an interval of just a few minutes. By further shortening the check interval, even highly automated attacks can be detected and blocked before any damage can occur.

Alternatively, the immediacy of the check can be ensured by using watchdogs. Modern operating systems allow the registration of a so-called watchdog. This informs the operating system that a specific process should be started if a file or the contents of a directory are manipulated. This process is known as a watchdog.

In one embodiment of the method according to the invention, a watchdog can be used to provide an immediate response to manipulation of the data without blocking a lot of resources by constantly checking. This is therefore a resource-saving implementation for securing the immediacy of checking the manipulated data.

It may be provided in the method that data defined by a user (e.g. files, parts of files and/or other data) are registered for checking (S03) for manipulations or that data defined by a user (e.g. files, parts of files and/or other data) are excluded from checking (S03) for manipulations. In a further embodiment of the invention, the user of the method according to the invention can therefore determine that data, files or parts of files (file parts) of the web service are checked in step S03, i.e. in the step of checking (S03), and are isolated in the event of manipulation (blacklisting). In a preferred further embodiment of the invention, the user of the method according to the invention can specify that data, files or parts of files of the web service are not checked in step S03, i.e. in the checking step (S03) (whitelisting). Both embodiments of the method represent options for deviating from the intended principle of placing all manipulated files in quarantine according to the zero-trust approach. The whitelisting approach is the preferred embodiment of the invention, as it allows the user to accept known changes in order to prevent false positive tampering cases—i.e. those that were not hostile. At the same time, the zero-trust approach remains consisting of all unlisted tampering cases, including potential unknown cases.

In a further preferred embodiment, in step S01 of the method, i.e. in the step of generating the intended state (S01), supposedly dynamic data of the web service, in particular files, such as HTML pages rendered by PHP, for example, are transferred to the secondary system as static files, such as HTML, JSON or XML files, insofar as the operated service allows this. This is helpful in order to execute possible security gaps in the executable program code, as far as possible, exclusively on the primary, secure system and to improve the loading times and reliability of the service.

It may be provided that the triggering of the transferring of data from the primary computer system (1) to a secondary computer system (7)
  a) is triggered manually, or
  b) is triggered automatically on a time-controlled basis, or
  c) is triggered automatically after the intended state of the data is changed.

In one possible embodiment of the method according to the invention, the transferring of data from a primary to a secondary system takes place manually. This gives the website operator full control over which data is transferred and when.

In a preferred embodiment, the transfer of data is automatically time-controlled, which ensures that the web service in its publicly accessible form is regularly updated to the current intended state of the data. The time control can in turn correspond to a random pattern so that a potential attacker cannot predict when a new transmission will take place.

In a particularly preferred embodiment of the method, the data is transferred automatically after the intended state of the data has changed. This has the advantage that the publicly accessible version of the data always corresponds to the most recently updated status.

The transfer of the data can optionally comprise a) the entire intended state, but preferably b) only the difference to the previous intended state of the data from the primary to the secondary system. According to a), the possibility of errors due to an incorrect delta calculation is more limited, but b) offers a bandwidth saving, which is particularly advantageous for extensive data. In addition, the incremental update option offers the advantage that even compromised communication between the primary and secondary systems does not allow any conclusions to be drawn about all the data for the operation of the web service. According to a preferred embodiment of the invention, only the difference between the intended state and the previous intended state of the data is transferred from the primary computer system (1) to the secondary computer system (7) in the step transferring of data (S02). In a further preferred embodiment of the invention according to a), each change of an intended state (3) and each transmission to the secondary computer system in the step transferring of data (S02) is stored in an audit-proof manner, thereby enabling subsequent auditing.

In a further embodiment of the method, the change of intended states and their transmission is stored in an audit-proof manner, enabling subsequent auditing.

The auditing of changes is a practice in which it can be traced retrospectively when which changes were made and by whom. To do this, it must be possible to store the data in an audit-proof, unchangeable format.

This is preferably done using a blockchain, as information is stored and transmitted in an audit-proof manner in a decentralized manner, which means that S02 can also be implemented at least in part.

Blockchain is a technology that stores information in a similar way to a database. The information is not stored in a centralized location in a computer system, but is located on many systems simultaneously. All instances of the database contain all the information and the entire history can be accessed at any time. As long as there is no consensus in the network of all instances, historical entries cannot be deleted.

The method according to the invention also protects data in a database. The integrity of the data in the database is secured by
  a) either after each desired manipulation of the data by the web service, the corresponding query is first checked for malicious entries (e.g. SQL injections, or changes to prohibited data records, such as database users or rights), then transferred to the primary system in a secured manner and the changes made to the data are subsequently mirrored to the secondary systems, or
  b) after each desired manipulation of the data by the web service, the query is first checked for malicious entries (e.g. SQL injections, or changes to prohibited data records, such as database users or rights) and then secured and transferred to the primary system, and read accesses to the database are also checked by the agent and transferred to the primary system, so that no database is required in the secondary system, or
  c) the database on the secondary system is regularly checked for unintended changes to prohibited data records such as database users or other data that does not need to be processed by the service.

According to a preferred embodiment of the invention, the data for generating the web service is selected from data in a database, and wherein the integrity of the data in the database (4) is secured by
  a) either each query to the database (13) is first checked, in particular by the agent (11), for malicious entries (e.g. SQL injections, or changes to prohibited data records, such as database users), then secured and transmitted (14) to the primary database (4) of the primary computer system (1) and subsequently the changes made are mirrored to the secondary database (9) in the secondary computer system (7), or
  b) each request to the database (13) is first checked, in particular by the agent (11), for malicious input and then transmitted (14) in a secured manner to the primary computer system (1), and read accesses (15) to the database are also checked, in particular by the agent (11), and transmitted (16) to the primary computer system, so that no database is required in the secondary system (7), or
  c) the database on the secondary system (9) is regularly checked, in particular by the agent (11), for changes to prohibited data records that are not to be processed by the web service (8).

The protection of data in databases is particularly relevant because it can prevent well-known problems such as SQL injections. SQL injections are a major security problem in which an attacker can gain access to any data in a database if the software accessing the database has not been appropriately secured. No state of the related art method protects any third-party software from such attacks.

This is particularly relevant because small and medium-sized companies in particular often use software, e.g. to operate a web store, that they do not develop themselves, which means that they have no information about possible security vulnerabilities.

In a preferred embodiment, several secondary systems are operated in parallel in order to distribute the load by means of load balancing and thus minimize loading times of the operated service and furthermore advantageously increase reliability. Consequently, several secondary systems (7) can be operated in parallel in order to advantageously enable load balancing, in particular of the web application.

In a further preferred implementation of the method with multiple secondary systems, after a breach of the integrity of a datum, the entire secondary server or system (7) on which the integrity has been damaged is isolated to enable subsequent analysis of the entire attack. In this case, isolation also includes stopping the entire system to prevent any malware that May be running from removing its traces. This makes it easier to attribute the attack.

In a further preferred implementation of the method, if the entire secondary system is isolated, the system is not stopped in order to analyze the further mode of action of the malware that may be running. In other words, the isolated secondary system is preferably not terminated, but continues to operate in isolation for the purpose of analyzing the malware. This method can also be used advantageously if it can be assumed that the malware removes its traces when the program is terminated.

It is also preferable to start a replacement system if a secondary system is isolated in order to maintain the load balancing function.

In a further embodiment of the method, a reverse proxy is also introduced to prevent so-called (D)DOS attacks. This can be done in an embodiment with one or more secondary systems. For example, it may be provided that a reverse proxy is used on the secondary system (7) in order to advantageously protect the web service (8) from (D)DOS attacks.

According to a preferred embodiment, protection against (D) DoS is implemented in addition to load balancing.

Denial of Service (DOS) is an attack strategy on web services in which attackers attempt to send as many requests as possible to the server at the same time, which the server cannot answer all at the same time.

In this way, the service is overloaded and customers of the service sometimes receive no response at all, an error, or the response takes a very long time. This can cause considerable damage to the operator, especially if the attack lasts longer, as revenue is usually lost during this time because potential customers are unable to access the web service. If the attack comes from many distributed computer systems, it is referred to as a Distributed Denial of Service (DDoS).

In recent years in particular, Internet of Things (IoT) devices such as smart light bulbs or webcams have been used for such DDOS attacks. This is particularly possible because their software is only very rarely provided with security updates. By using the method according to the invention in such IoT devices, they would also be protected and the use of such devices for such attacks would be made significantly more difficult.

Furthermore, a reverse proxy is implemented in the method according to the invention, which serves, among other things, to protect against (D)DOS attacks in order to advantageously contribute to lower loading times and to avoid a failure of the service with associated loss of revenue.

In particular, several secondary systems can also be used for the purpose of load balancing and reducing loading times through clever spatial distribution.

In a preferred version of the method, the manipulated data is analyzed within the isolation after manipulation has been performed. The data analysis can serve several possible objectives. In one embodiment of the method, the objective of the analysis is to determine the target of the attack within the web service. This is advantageous if the manipulated data has been isolated without a more detailed threat analysis, for example to ensure that a secure state is established particularly quickly. In this case, a target analysis can be carried out retrospectively. The analysis can advantageously identify possible vulnerabilities in the system that an attacker wanted to exploit.

In a further embodiment of the method, the aim of the analysis is to obtain data on attack patterns from the manipulation. Advantageously, knowledge databases of attack patterns can be compared and expanded in order to record new threats or identify possible attackers. It can also be advantageous to expand the database for other security systems that do not isolate every manipulation across the board, but instead attempt to differentiate between malicious and benign manipulations (see blacklisting, antivirus programs in the state of the related art). Collecting or selling such data results in an economic advantage according to the invention.

In one version of the method, the analysis of the manipulated data is carried out manually. With the involvement of security experts, a data set of particularly high quality can be created, especially with regard to the identification of the attack target and the classification of manipulation as malicious or non-malicious.

In a particularly preferred version of the method, the analysis of the manipulated data is carried out automatically. Statistical analysis methods can be used for this, in particular the clustering of manipulation types, or statistical similarity analyses with known attack types from knowledge databases. In a particularly preferred embodiment, machine learning methods are used for data analysis, especially for clustering manipulation types and classifying the degree of maliciousness of attacks. In the case of manipulation of a semantic nature (e.g. SQL injection), in a particularly preferred embodiment of the method, deep learning methods are used for language processing to detect patterns within the manipulation or to perform maliciousness classification. Any automated data analysis can significantly increase the efficiency of data utilization. In particular, by collecting and using large amounts of manipulation data, automated data analysis methods also offer increasing precision, resulting in an economy of scale.

The method according to the invention is realized on various computer systems of a primary as well as at least one secondary system, by one or more computer programs.

The invention also relates to a system for protecting the integrity of data, in particular a distributed computer system, e.g. a distributed fractional computer system, comprising means for carrying out the steps of the method according to the invention as defined herein, wherein the individual steps are preferably realized together or individually in a distributed computer environment. Examples of such a system include a networked client-server system with a smartphone as a client having access to storing or processing resources in a computer cloud, file sharing by devices in a peer-to-peer network, an augmented reality environment with head-mounted displays, autonomous vehicles interacting via an ad hoc network or networked in a distributed ledger system using blockchain. Nevertheless, there may also be provided a computer program for protecting the integrity of the data comprising instructions which, when the program is executed by a computer, cause the computer to execute the method according to the invention, in particular the steps of the method, in each case as defined herein. The invention further comprises a computer-readable medium comprising instructions which, when executed by a computer, cause the computer to perform the method according to the invention, in particular the steps of the method, each as defined herein.

In a preferred embodiment of the invention, there is also provided such a computer program product, herein also referred to as a first computer program product, comprising instructions which, when the program is executed by a computer, cause the computer to perform the steps of generating (S01) an intended state (3) of data, wherein preferably also supposedly dynamic data is converted into static data. In addition, it controls the transmission of the intended state to the server in the insecure network either manually, time-controlled or automatically after the intended state of the data has changed. It is also capable of transmitting the intended state either completely or as a differential update. Preferably, the first computer program is provided or arranged within a system, more preferably within a distributed computer system, for example within a distributed fractional computer system as defined herein.

Preferably, in the steps of generating the intended state (S01), the first computer program transfers supposedly dynamic data of the web service, such as HTML pages rendered by PHP, for example, to the secondary computer system as static files, such as HTML, JSON or XML files, to the extent permitted by the service being operated. Irrespective of this, it may be provided that the triggering of the transferring of data from the primary computer system (1) to a secondary computer system (7)
 a) is triggered manually, or
 b) is triggered automatically on a time-controlled basis, or
 c) automatically after changing the intended state of the data
is triggered.

In one embodiment of the invention, it may be provided that only the difference between the intended state and the previous intended state of the data is transferred from the primary computer system (1) to the secondary computer system (7) by the first computer program during the steps transferring of data (S02).

In one embodiment of the invention, it may be provided that the first computer program stores each change to an intended state (3) and each transfer to the secondary computer system in an audit-proof manner during the steps transferring of data (S02), thereby enabling subsequent auditing.

According to a particularly preferred embodiment, the first computer program may be set up to comprise instructions which, when the program is executed by a computer, cause the computer to perform the method according to the invention as defined herein.

The invention further also comprises a computer-readable medium (data carrier) comprising the first computer program as defined herein, in particular for defining the intended state in S01.

Preferably, the primary computer system (primary system) comprises the first computer program product and/or the computer-readable medium comprising the first computer program product, which is set up to generate (S01) the intended status of the data, in particular according to the method as defined herein. Preferably, the primary computer program product is provided or set up within a system, more preferably within a distributed computer system, for example within a distributed fractionated computer system, in each case as defined herein.

The invention also relates to such a computer program product, also referred to herein as a secondary computer program product, comprising instructions which, when the program is executed by a computer, cause the computer to implement the steps S03 and S04, i.e. the steps of checking (S03) and restoring (S04). Preferably, placing the manipulated data in quarantine is implemented, wherein checking the data by means of cryptographic methods is performed immediately after its manipulation and securing the database by one of the above-mentioned means. Should the secondary computer program be terminated, it is automatically restarted by the secondary computer system. Preferably, the first computer program product is provided or set up within a system, more preferably within a distributed computer system, for example within a distributed fractional computer system as defined herein.

According to a preferred embodiment of the invention, the secondary computer program detects changes in the data, as an example of manipulation (17) of data, based on cryptographic methods.

It may be provided that the secondary computer program is set up to perform checking (S03) (20) of the integrity of the data (also referred to as checking), in particular of the files and/or parts of files, immediately after manipulating (17) the data, in particular the files and/or parts of files.

In one embodiment of the invention, it may be provided that the secondary computer program is set up in such a way that data defined by a user (e.g. files, parts of files and/or other data) are registered for checking (S03) for manipulations or data defined by a user (e.g. files, parts of files and/or other data) are excluded from checking (S03) for manipulations.

According to a preferred embodiment of the invention, the secondary computer program is configured such that it comprises instructions for selecting the data for generating the web service from data in a database, wherein the integrity of the data in the database (4) is secured by
  a) either each query to the database (13) is first checked, in particular by the agent (11), for malicious entries (e.g. SQL injections, or changes to prohibited data records, such as database users), then secured and transmitted (14) to the primary database (4) of the primary computer system (1) and subsequently the changes made are mirrored to the secondary database (9) in the secondary computer system (7), or
  b) each request to the database (13) is first checked, in particular by the agent (11), for malicious input and then transmitted (14) in a secured manner to the primary computer system (1), and read accesses (15) to the database are also checked, in particular by the agent (11), and transmitted (16) to the primary computer system, so that no database is required in the secondary system (7), or
  c) the database on the secondary system (9) is regularly checked, in particular by the agent (11), for changes to prohibited data records that are not to be processed by the web service (8),
is checked.

According to a preferred embodiment of the invention, the secondary computer program product is designed such that it comprises instructions which allow the manipulated data to be analyzed by means of manual and automated data processing methods after manipulation has taken place.

Preferably, the secondary computer program is provided or set up within a system, more preferably within a distributed computer system, for example within a distributed fractionated computer system as defined herein.

According to a particularly preferred embodiment of the invention, all features of the method according to the invention, as defined herein, can be realized by the secondary computer program, as conceived.

The secondary computer program is preferably contained on a secondary computer-readable medium (data carrier).

The secondary computer program preferably protects a tertiary computer-readable medium (data carrier).

A secondary computer system preferably comprises a secondary and/or a tertiary medium. A medium may combine the properties of the secondary and the tertiary medium. Preferably, the computer program products of the present application are also themselves protected by a secondary computer program product so that they are themselves advantageously protected from manipulation.

A tertiary computer program preferably implements the transfer of the intended state from the primary to the secondary system. It is part of a computer-readable medium and is executed either on the primary or a secondary or a further tertiary system. Preferably, the tertiary system is at least partially, in particular completely, protected by the primary and/or secondary, in particular by the secondary computer program as defined herein. The invention therefore preferably also comprises a tertiary computer program comprising instructions which, when the program is executed by a computer, cause the computer to implement the step of transmitting (S02) according to the method according to the invention.

According to a particularly preferred embodiment of the invention, all features of the method according to the invention, as defined herein, can be realized by the tertiary computer program—according to the concept.

According to a preferred embodiment of the invention, the tertiary computer program is configured such that it comprises instructions for selecting the data for generating the web service from data in a database, wherein the integrity of the data in the database (4) is secured by
  a) either each query to the database (13) is first checked, in particular by the agent (11), for malicious entries (e.g. SQL injections, or changes to prohibited data records, such as database users), then secured and transmitted (14) to the primary database (4) of the primary computer system (1) and subsequently the changes made are mirrored to the secondary database (9) in the secondary computer system (7), or
  b) each request to the database (13) is first checked, in particular by the agent (11), for malicious input and then transmitted (14) in a secured manner to the primary computer system (1), and read accesses (15) to the database are also checked, in particular by the agent (11), and transmitted (16) to the primary computer system, so that no database is required in the secondary system (7), or
  c) the database on the secondary system (9) is regularly checked, in particular by the agent (11), for changes to prohibited data records that are not to be processed by the web service (8),
is checked.

According to a preferred embodiment, the tertiary computer program is designed in such a way that several secondary systems are operated in parallel in order to advantageously enable load balancing of the web application. In addition to load balancing, protection against (D) DoS may also be implemented.

According to a preferred embodiment, the tertiary computer program is configured to comprise instructions whereby, upon violation of the integrity of a datum, the entire secondary system or the multiple secondary systems on which the integrity has been corrupted is/are isolated.

According to a preferred embodiment, the tertiary computer program is configured to comprise instructions whereby the isolated secondary system or the plurality of isolated secondary systems is/are not terminated but continues to operate in isolation for the purpose of analysis of the malware.

It may be envisaged that the tertiary computer program is designed to comprise instructions whereby, after isolating the (compromised) system whose integrity has been damaged, another secondary system is started as a replacement system.

According to a preferred embodiment, the tertiary computer program is designed in such a way that a reverse proxy is used on the secondary system in order to protect the web service (8) advantageously from (D)DOS attacks.

The tertiary computer program is preferably contained on a tertiary computer-readable medium (data carrier).

Preferably, a tertiary computer system (primary system) comprises the tertiary computer program product and/or the tertiary computer-readable medium comprising the tertiary computer program product set up for transmission (S02) within the method according to the invention. Preferably, the tertiary computer system is provided or set up within a system, more preferably within a distributed computer system, for example within a distributed fractional computer system as defined herein.

The computer programs can also be extended with plugins to add further functionalities for operating and improving a web service. For example, a plugin could be added for the processing and analysis of the generated data traffic, whereby this service advantageously does not have to be provided by a third-party provider and other aspects of data economy and data protection can be maintained by keeping the information with the operator of the web service.

The invention also comprises a network comprising a computer system, in particular a system for protecting the integrity of data, in particular a distributed computer system, e.g. distributed fractional computer system, as defined herein, and/or a primary computer system, a secondary computer system and/or a tertiary computer system, each as defined herein.

Several methods can be used to ensure that the computer program(s) themselves are not manipulated, which would invalidate the protection. These make it more difficult to change the functionality of the computer program product so that protection is further increased.

On the one hand, the computer program used to implement the method can monitor the folder structure or the medium in which it is stored. While it is stored in the computer's working memory, it is strongly protected against manipulation. If the program itself is modified on the medium, it can detect the change and restore itself.

Furthermore, the program can be stored on a medium that cannot be rewritten, e.g. an EPROM or an SD card with write protection.

Furthermore, many operating systems already protect parts of their directory structure in such a way that they can only be written to in safe mode and otherwise cannot even be modified by the system itself. The computer program could be stored in such a part of the directory structure while using safe mode in order to continue to protect it advantageously.

It is also possible to manipulate the computer program in the working memory. The structure of the program in the working memory could be detected by a specialist, who could then search for the program in the memory and manipulate it by exploiting other vulnerabilities, such as buffer overflows. By taking targeted measures, the computer program can make such attacks more difficult. To do this, it fills random memory areas with random contents to make analysis and manipulation of the instructions contained in the program more difficult by changing their position with each execution and over time.

Further advantageous embodiments and further developments can be seen from the sub-claims and from the description with reference to the figures.

DESIGN EXAMPLES

With reference to the following figures and embodiments, the present invention will be explained in more detail, without limiting the invention to these.

This shows

Figure 1:
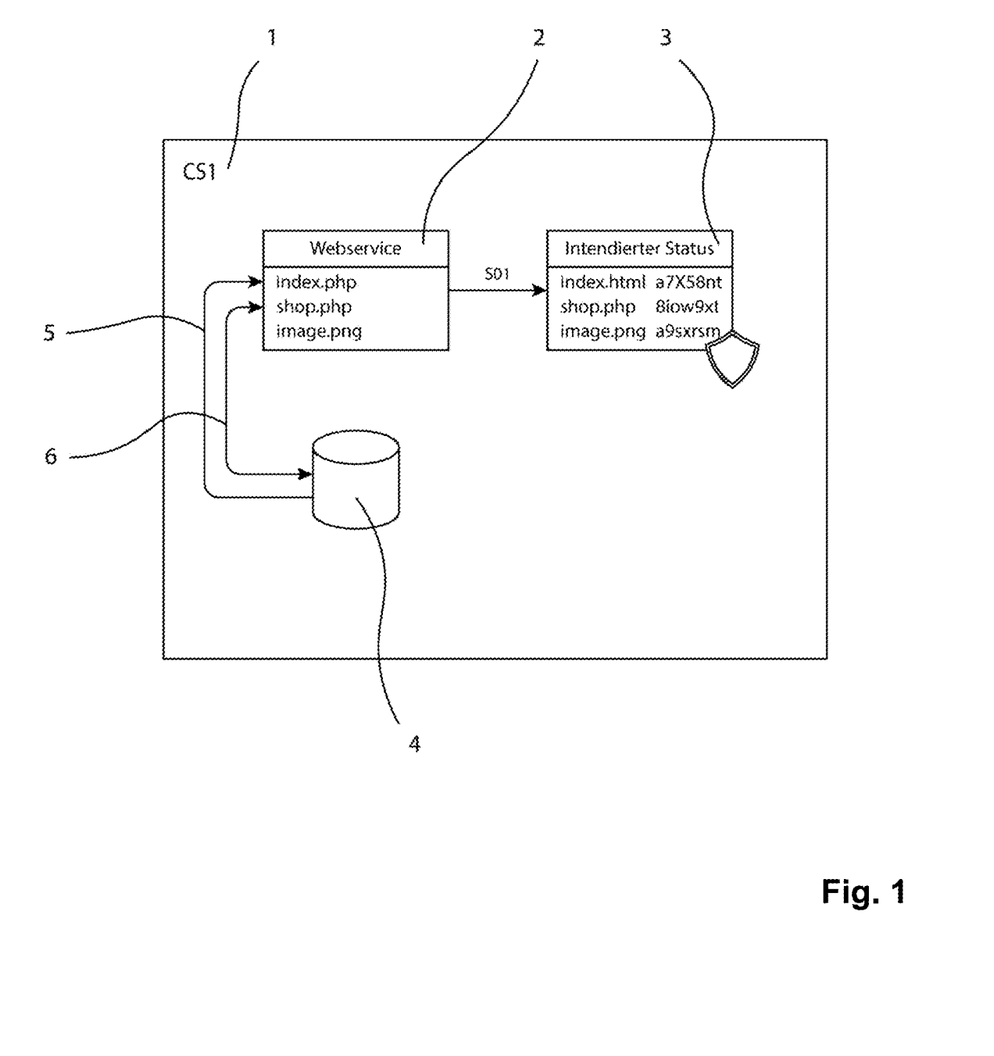

FIG. 1: a schematic representation of the primary computer system CS1 (1). Shown is a web service (2) running on CS1 with dynamic content ("index.php" and "store.php") and a static image file (image.png). Both dynamic files use the database (4), but the file "index.php" (5) reads data from the database (4), which does not change in this example. Therefore, the file "index.php" can be converted to a static file (index.html) by a computer program (S01). The file "store.php" reads and writes (6) data from and to the database (4). Therefore, it cannot be converted into a static file. Nothing changes in the already static file either. This results in the intended state of the web service files (3). Furthermore, the hashes, indicated by alphanumeric character strings next to the file names, are calculated and stored in step S01. The shield is intended to illustrate the corresponding backup of the files.

Figure 2:
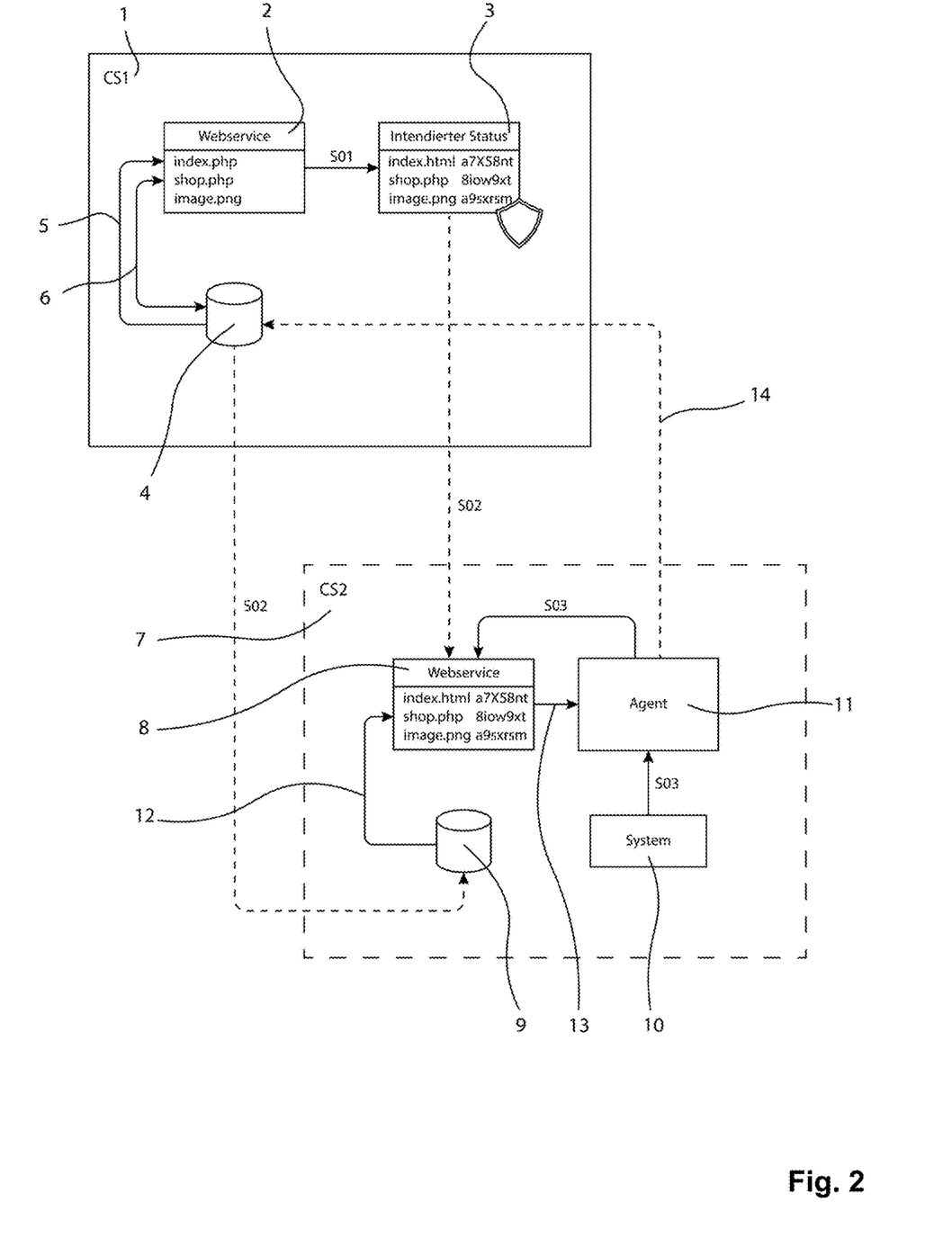

FIG. 2: A schematic representation of the CS1 (1) from FIG. 1 together with a second, secondary system CS2 (7) in an insecure network. S02 transfers the intended state (3) of the database (4) and the files of the web service (2) to the secondary system (7). An agent (11) takes action in the event of changes to the data at file system level (reported by the operating system (10)) or at regular intervals to check the integrity of the data of the web service (2). Changes to the database (4) (in the example by the file "store.php") are checked (13) by the agent (11) before it transfers (14) these changes to the database (4) in the primary system (1) and these are again entered into the secondary database (9) of the secondary system (7) by S02. The dynamic files (in the example the file "store.php") read (12) the necessary data from the database in the secondary system (9). Step S03, the checking of the files of the secondary web service (8) by the agent (11) after manipulation, is triggered either time-controlled or by a watchdog.

Figure 3:
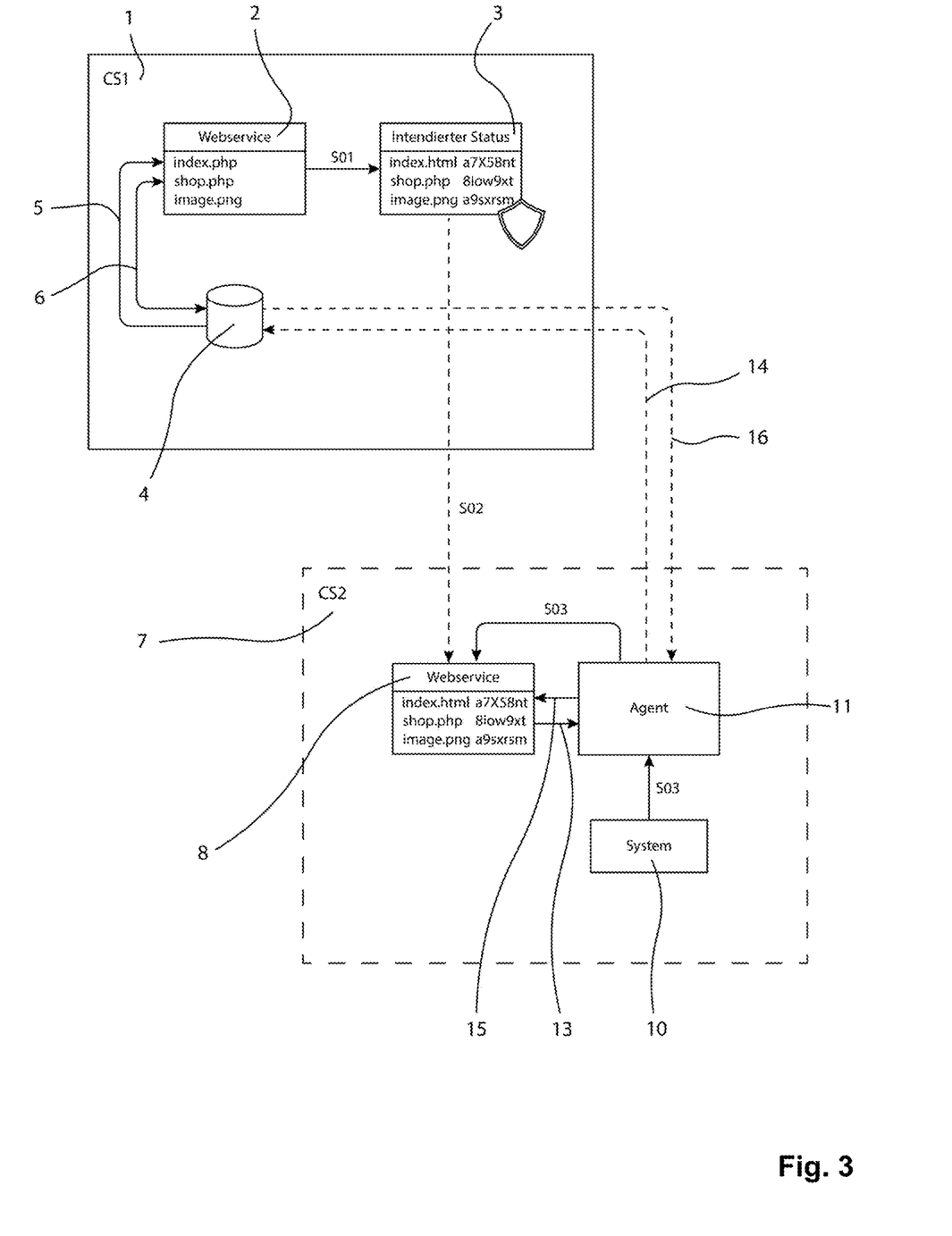

FIG. 3: A schematic representation of the primary computer system (1) and the secondary computer system (7). In this case, there is no database in the secondary system (7). S02 transfers the intended state (3) of the files of the web service (2) to the secondary system CS2 (7). Once again, the operating system (10) triggers step S03 either when the data changes (via a watchdog) or in a time-controlled manner, whereupon the agent (11) compares the files of the web service (8) in the secondary system (7) with the intended data (3) of the primary system (1). Since the secondary database is omitted, the read access (15) of files such as the "store.php" to the database (4) of the primary system (1) is performed by the agent (11) (16). Write access (13) is checked by the agent (11) as in FIG. 2 and then transferred (14) to the primary database (4).

Figure 4:
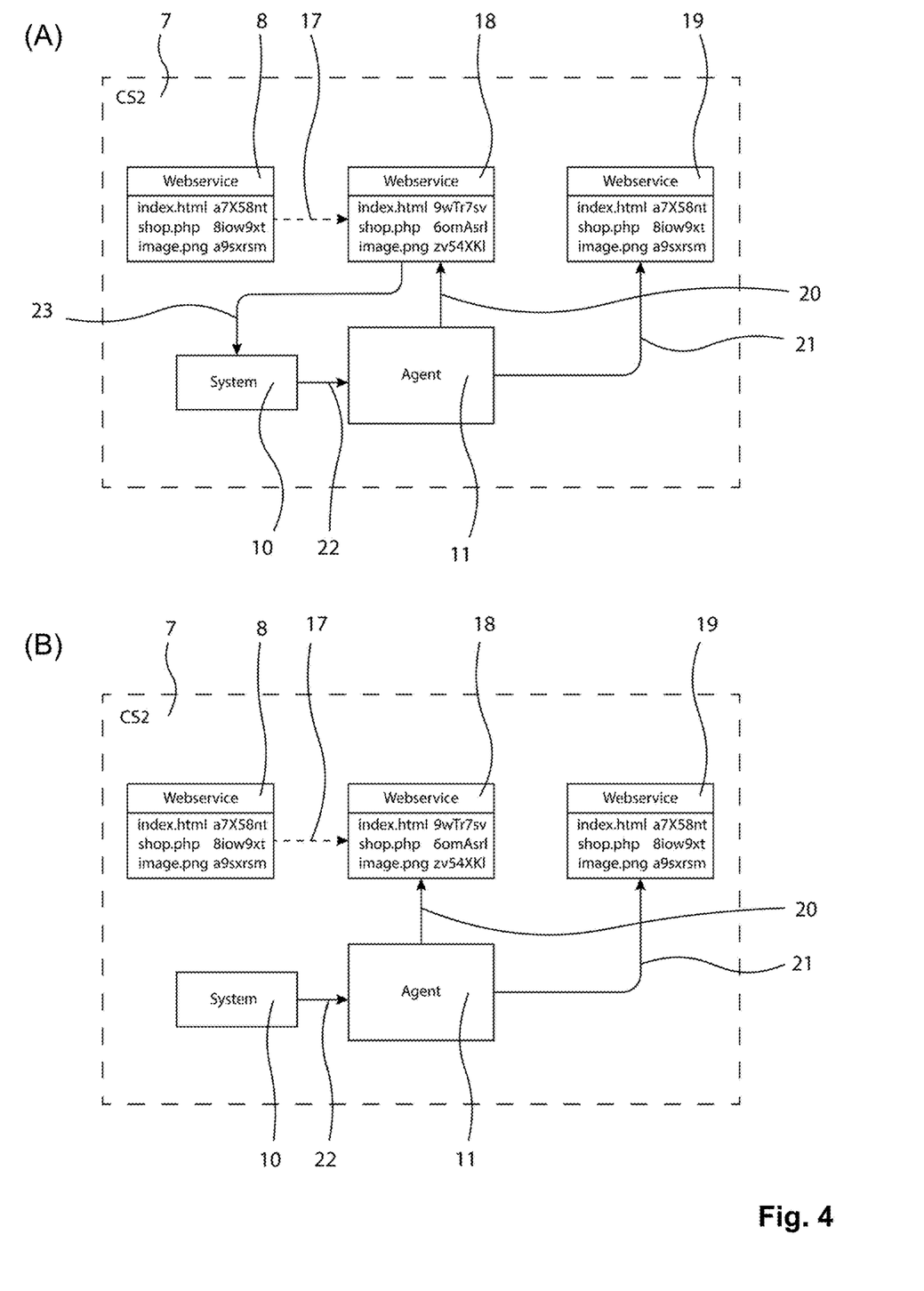

FIG. 4: Schematic representation of how the agent (11) acts in the event of undesired manipulation (17 of the files (S04)).

A) The method using a watchdog: In this case, the operating system (10) reacts (23) to the change in the files of the web service (8) and informs (22) the agent (11). This agent checks (20) all files of the web service in the possibly manipulated state (18). After detecting a change by means of a cryptographic method, in this case by means of a hash value, it restores (21) the desired file states (19) and places the manipulated files (18) in quarantine for later analysis.

B) In this case, the operating system (10) regularly reports (22) the system time or the exceeding of a certain time interval to the agent (11), which checks (20) the current state of the files of the web service (18) and, after an undesired manipulation (17), comes to the conclusion that they have been manipulated, whereupon it restores (21) the desired state of the files and, if necessary, places the manipulated files (18) in quarantine for later analysis.

Common to all embodiments is the fact that the primary computer system CS1 (1) can only be reached by the agent (11) via a secure connection. The web service (2) of the primary system (1) is only necessary to establish the intended state (3) and to be able to convert supposedly dynamic files into static files (e.g. by rendering HTML through a PHP file). The intended state can be determined in step S01 using various cryptographic methods. FIGS. 2 and 3 differ only in the use of the database, in particular in how the integrity of the data in the database is secured.

In principle, there can be any number of secondary systems (7), even if this is not shown graphically. In the configuration with a secondary system (7), the agent (11) also serves as a reverse proxy to protect against DDOS attacks, so that the secondary systems (7) do not have direct access to the web services (8) of the secondary system (7).

REFERENCE LIST

1 Computer system 1 (primary system)
2 Web service on the primary system
3 Intended status of the web service files after reduction to static files (S01) by the primary computer program
4 Database of the web service on the primary system
5 Read access of the "index.php" file to the database
6 Read/write access of store.php to the database
7 Computer system 2 (secondary system)
8 Web service with the intended state of the files after step S02
9 Database on the secondary system, with desired state synchronized by S02
10 Operating system mechanism for starting the test (S03) (watchdog or timer)
11 Agent running on computer system 2 (secondary computer program)
12 Read access of the file "store.php" from the database of the secondary system
13 Write access of the file "store.php" sent to the agent (14)
14 Write access of the file "store.php" after the check to the agent to update the desired state of the database of the primary system
15 Read access of the file "store.php", where the agent reads directly from the database of the primary system (16) without first mirroring it to a secondary database
16 Read access of the agent triggered by the read access of the file "store.php" (15) Checked by the agent (11)
17 Manipulation of the web service files
18 Manipulated web service
19 Web service in the restored intended state
20 Determining the manipulated state of the files by the agent
21 Restoring the intended state by the agent with deletion of the manipulated files or preferably placing the files in the manipulated state in "quarantine"
22 Signal from the system to the agent that a file has been changed (watchdog) or a time interval has elapsed (timer)
23 Registering the file change with the system

The invention claimed is:

1. A method of protecting the integrity of data comprising the following steps:
   a) running a web service on a primary, secure computer system including a complete data set;
   b) generating an intended state of the data of the web service on the primary, secure computer system, wherein the intended state of the data include dynamic data which have been converted to static files;
   c) transferring the intended data set through a secure connection to one or more secondary computer systems in a potentially insecure network on which the web service is executed;
   d) checking the integrity of the intended data set by detecting manipulation of files and data of the intended data set by an attacker, wherein after manipulation, the manipulated data is placed in quarantine and may be analyzed in a further step but is no longer executed and thus cannot cause any damage;
   c) restoring the intended state of the data at the time before manipulation by transferring the intended data set stored on the primary computer system to the one or more secondary computer systems, wherein a manipulation of data has been detected;
   f) wherein data defined by a user is registered for checking for manipulations or data defined by a user is excluded from checking for manipulations.

2. The method according to claim 1, wherein checking the integrity of the intended data set is performed immediately after manipulating the intended data set.

3. The method according to claim 1, wherein triggering the transferring of the intended data set from the primary computer system to the one or more secondary computer systems
   a) is triggered manually, or
   b) is triggered automatically on a time-controlled basis, or
   c) is triggered automatically after changing the intended state of the data.

4. The method according to claim 1, wherein the data for generating the web service is selected from a database, and wherein the integrity of data in the database is secured, wherein
   a) either each query to the database is first checked for corrupt entries, then transmitted in a secured manner to the primary database of the primary computer system and subsequently the changes made are mirrored to a secondary database in the secondary computer system, or
   b) each request to the database is first checked for malicious entries and then transmitted in a secured manner to the primary computer system, and read accesses to the database, in particular by an agent, are also checked and transmitted to the primary computer system, so that no database is required in the secondary system, or
   c) the secondary database in the one or more secondary computer systems is checked regularly for changes to prohibited data records that should not be edited by the web service.

5. The method according to claim 1, wherein in the step transferring of the intended data set only the difference of the intended state to the temporally preceding intended state of the data set is transferred from the primary computer system to the secondary computer system.

6. The method according to claim 1, wherein a reverse proxy is used on the one or more secondary computer systems to advantageously protect the web service from (D)DOS attacks.

7. The method according to claim 1, wherein several secondary computer systems are operated in parallel in order to advantageously enable load balancing, in particular of the web application.

8. The method according to claim 7, wherein upon violation of the integrity of a datum, the entire secondary computer system on which the integrity has been damaged is isolated.

9. The method according to claim 8, wherein the isolated secondary computer system is not terminated but continues to operate in isolation for the purpose of analyzing malware.

10. The method according to claim 9, wherein after isolating the secondary computer system whose integrity has been damaged, another secondary computer system is started as a replacement system.

11. The method according to claim 7, wherein, in addition to load balancing, protection against (D) DoS is implemented.

12. The method according to claim 1, wherein after manipulation of the data of the intended data set has been performed, the manipulated data is analyzed by manual and automated data processing methods.

* * * * *